United States Patent
Chen et al.

(10) Patent No.: US 9,516,261 B2
(45) Date of Patent: Dec. 6, 2016

(54) REAL-TIME FALSE COLOR REDUCTION SYSTEM AND METHOD FOR COLOR INTERPOLATION

(71) Applicant: Realtek Semiconductor Corp., Hsinchu (TW)

(72) Inventors: Shih-Tse Chen, Chu Pei (TW); Wen-Tsung Huang, Chia Yi (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 74 days.

(21) Appl. No.: 14/479,801

(22) Filed: Sep. 8, 2014

(65) Prior Publication Data
US 2015/0138439 A1    May 21, 2015

(30) Foreign Application Priority Data
Nov. 19, 2013  (TW) .............................. 102141997 A

(51) Int. Cl.
| | |
|---|---|
| H04N 19/102 | (2014.01) |
| H04N 7/01 | (2006.01) |
| H04N 19/132 | (2014.01) |
| H04N 9/04 | (2006.01) |

(52) U.S. Cl.
CPC ............ *H04N 7/0145* (2013.01); *H04N 9/045* (2013.01); *H04N 19/132* (2014.11); *H04N 2209/046* (2013.01)

(58) Field of Classification Search
None
See application file for complete search history.

(56) References Cited

U.S. PATENT DOCUMENTS

| | | | |
|---|---|---|---|
| 4,724,395 A | 2/1988 | Freeman | |
| 6,795,586 B1* | 9/2004 | Gindele | G06T 3/4007 382/210 |
| 7,683,948 B2* | 3/2010 | Yanof | H04N 1/401 348/246 |
| 7,755,682 B2* | 7/2010 | Lin | H04N 9/045 348/222.1 |
| 8,294,781 B2* | 10/2012 | Cote | H04N 5/208 348/222.1 |
| 8,305,458 B2* | 11/2012 | Hara | H04N 9/045 345/600 |

FOREIGN PATENT DOCUMENTS

TW    I272016    1/2007

* cited by examiner

*Primary Examiner* — Mark T Monk
(74) *Attorney, Agent, or Firm* — Muncy, Geissler, Olds & Lowe, P.C.

(57) ABSTRACT

A false color reduction system and method for color interpolation is disclosed in the present invention. The false color reduction system includes a red/blue color interpolation signal reference level estimator, a red/blue color interpolation signal noise analyzer and a red/blue color interpolation signal noise regulator. The red/blue color interpolation signal reference level estimator receives a RGB image array and a red/blue color interpolation signal of the RGB image array to generate a green difference signal. The red/blue color interpolation signal reference level estimator generates a red/blue reference level according to the green difference signal and an average signal. The red/blue color interpolation signal noise analyzer analyzes received signals to generate analysis result. The red/blue color interpolation signal noise regulator receives the analysis result to correct the red/blue color interpolation signal.

12 Claims, 7 Drawing Sheets

REAL-TIME FALSE COLOR REDUCTION SYSTEM AND METHOD FOR COLOR INTERPOLATION

BACKGROUND OF THE INVENTION (a) Field of the Invention

The invention relates to an image detection method and device, particularly to a false color reduction system and method for color interpolation.

(b) Description of the Related Art

In general, consumer electronics using a single sensor for image acquisition such as digital cameras, video recorders, multimedia mobile phones, surveillance systems, video phones usually use a Bayer color filter array (Bayer CFA) covered on a single sensor to record red, green, and blue color information simultaneously to achieved the purpose of cost reduction. As shown in FIG. 1, in a Bayer color filter array BCFA, each pixel records only a brightness value of one color. As shown in the figure, a R pixel only records brightness of red color and on the right-hand side of the figure a R spectrum filter only allows red light passing through to hit the sensor cell Sens; a G pixel only records brightness of green color and on the right-hand side of the figure a G spectrum filter only allows green light passing through to hit the sensor cell Sens; and a B pixel only records brightness of blue color and on the right-hand side of the figure a B spectrum filter only allows blue light passing through to hit the sensor cell Sens. The obtained raw CFA image can be processed via interpolation for missing color components to generate a full-color image.

It should be noted that the color interpolation calculation method needs to analysis image structure and color so that the calculation result has critical impact on the final output image quality.

In the color interpolation calculation method, when a step of sampling the RGB array image is processed, color noises such as color aliasing and false color often occur at edges and texture areas of an image to result in lowering image display quality.

BRIEF SUMMARY OF THE INVENTION

One object of the invention is to provide a false color reduction system and method to reduce color noises such as color aliasing and false color occurring at edges and texture areas.

One embodiment of the invention provides a false color reduction system, including a red/blue color interpolation signal reference level estimator, a red/blue color interpolation signal noise analyzer and a red/blue color interpolation signal noise regulator. The red/blue color interpolation signal reference level estimator receives a RGB image array and a red/blue color interpolation signal of the RGB image array, and calculates a difference value between a green target pixel or a green interpolation pixel corresponding to a red/blue target pixel of the RGB image array and an average value of a plurality of green pixels nearby the green target pixel or the green interpolation pixel to generate a green difference signal. The red/blue color interpolation signal reference level estimator further calculates an average signal of the red/blue color interpolation signal and a plurality of the same color pixels around the red/blue color interpolation signal, and generates a red/blue reference level according to the green difference signal and the average signal. The red/blue color interpolation signal noise analyzer is coupled to the red/blue color interpolation signal reference level estimator and receives the red/blue reference level. The red/blue color interpolation signal noise analyzer determines if a value of the red/blue color interpolation signal is larger than a sum of the red/blue reference level and a correlation value, and determines the value of the red/blue color interpolation signal is smaller than a difference between the red/blue reference level and the correlation value so as to generate an analysis result. The red/blue color interpolation signal noise regulator is coupled to the red/blue color interpolation signal noise analyzer and receives the analysis result to generate a corrected red/blue color interpolation signal.

Another embodiment of the invention provides a false color reduction method, including the following steps: receiving a RGB image array and a red/blue color interpolation signal of the RGB image array; calculating a difference value between a green target pixel or a green interpolation pixel corresponding to a red/blue target pixel of the RGB image array and an average value of a plurality of green pixels nearby the green target pixel or the green interpolation pixel to generate a green difference signal; calculating an average signal of the red/blue color interpolation signal and a plurality of the same color pixels around the red/blue color interpolation signal and generating a red/blue reference level according to the green difference signal and the average signal; receiving the red/blue reference level, determining if a value of the red/blue color interpolation signal is larger than a sum of the red/blue reference level and a correlation value, and determining the value of the red/blue color interpolation signal is smaller than a difference between the red/blue reference level and the correlation value so as to generate an analysis result; and receiving the analysis result to generate a corrected red/blue color interpolation signal.

The false color reduction system and method according to the embodiments of the present invention properly adjust a value of red or blue color interpolation signal according to original image array information without additional buffer memory so as to real-time correctly reconstruct an image to enhance image quality for solving the problems in the prior art.

BRIEF DESCRIPTION OF THE DRAWINGS

FIG. 5A shows a schematic diagram illustrating a Bayer color filter array.

FIG. 5B shows a schematic diagram illustrating a Bayer color filter array of a varied style.

FIG. 5C shows a schematic diagram illustrating a Bayer color filter array of a diagonal stripe style.

FIG. 5D shows a schematic diagram illustrating a Bayer color filter array of a random style.

DETAILED DESCRIPTION OF THE INVENTION

Figure 1:
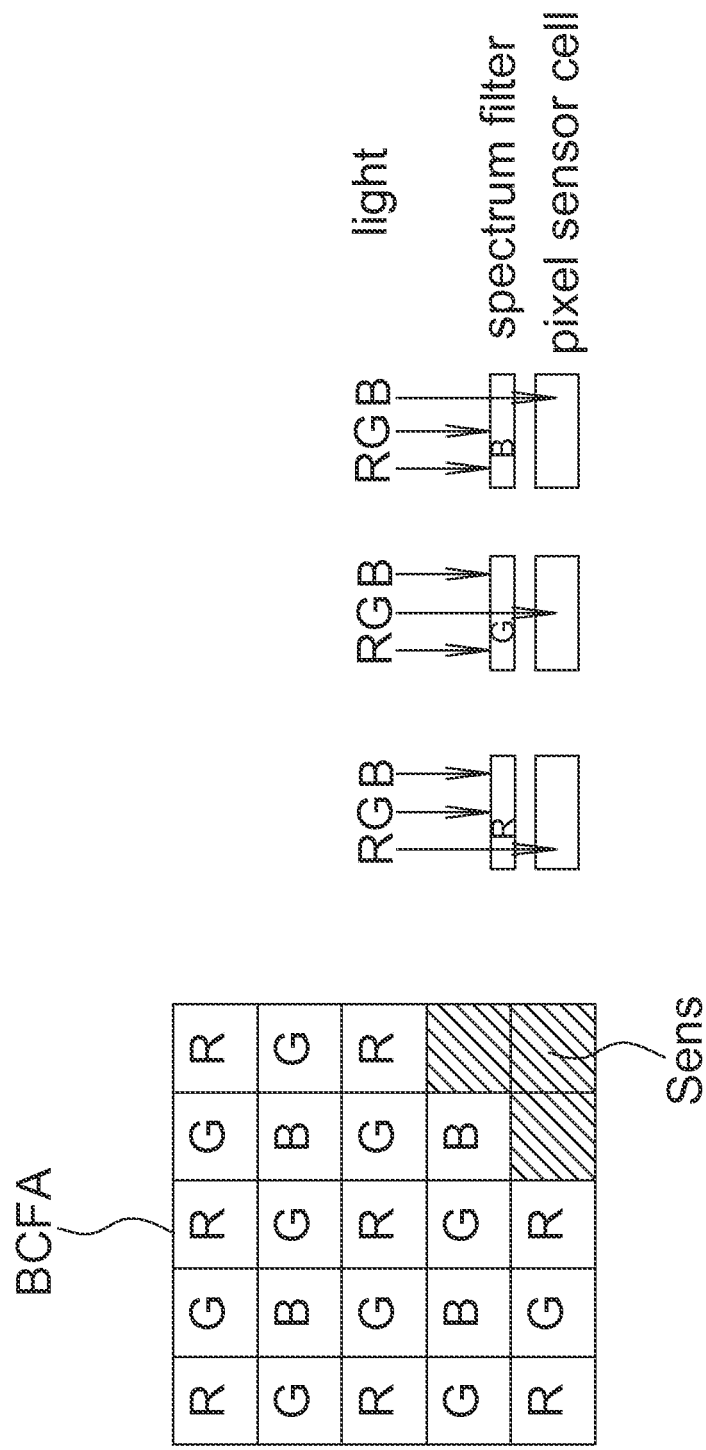
FIG. 1 shows a schematic diagram illustrating a Bayer color filter array and its filtering method according to the prior art.
Figure 2A:
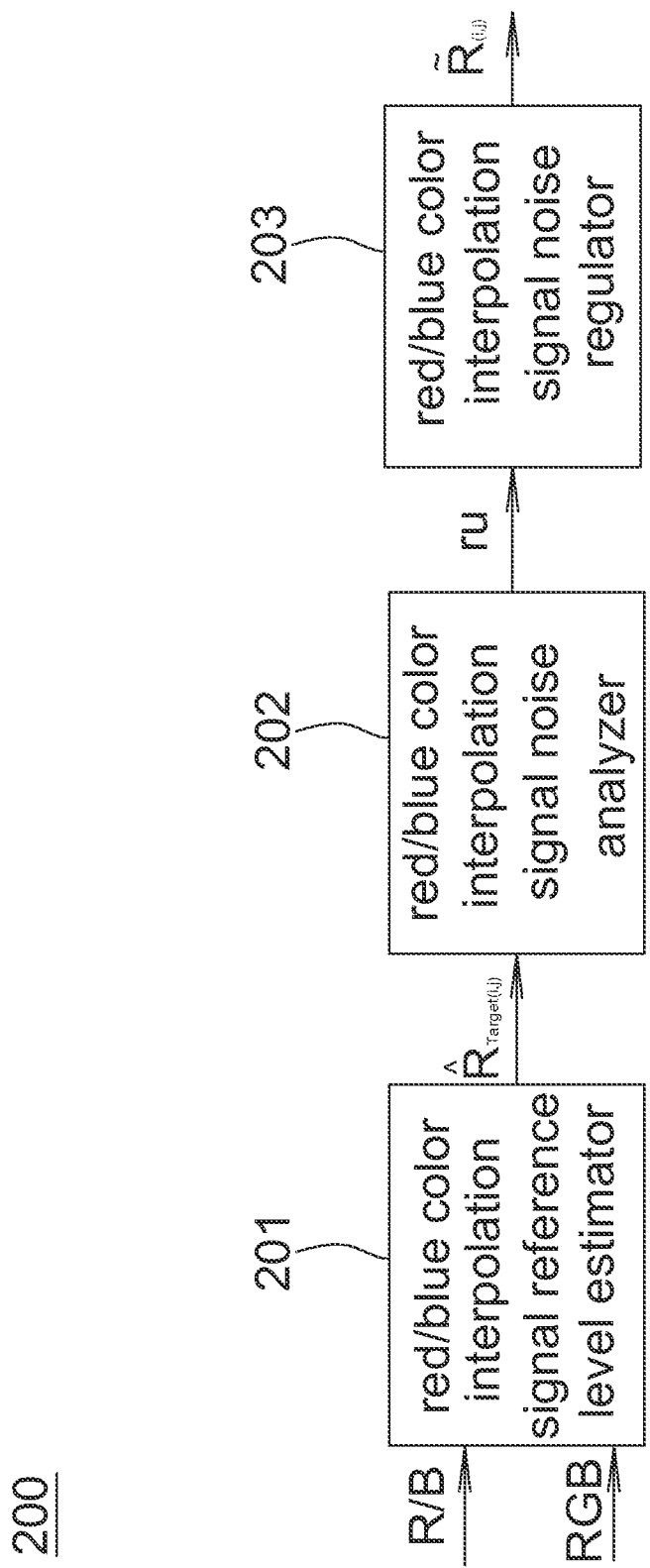
FIG. 2A shows a schematic diagram illustrating a false color reduction system according to one embodiment of the present invention.

FIG. 2A shows a schematic diagram illustrating a false color reduction system according to one embodiment of the present invention. The false color reduction system 200 includes a red/blue color interpolation signal reference level estimator 201, a red/blue color interpolation signal noise analyzer 202 and a red/blue color interpolation signal noise regulator 203.

The red/blue color interpolation signal reference level estimator 201 receives a RGB image array and a red/blue color interpolation signal R/B of the RGB image array and then calculates a difference value between a green target pixel G(i,j) and an average value $\overline{G}_{(i,j)}$ of green pixels nearby the green target pixel G(i,j) to generate a green difference signal $\Delta G(i,j)$, $AG(i,j)=\overline{G}_{(i,j)}-G_{(i,j)}$. In one embodiment, high-frequency mask processing may be used to obtain high-frequency information of the green target pixel G(i,j) for calculating the green difference signal $\Delta G(i,j)$.

Then, the red/blue color interpolation signal reference level estimator 201 further calculates an average signal $\overline{R}_{(i,j)}/\overline{B}_{(i,j)}$ of the red/blue color interpolation signal R/B and a plurality of the same color pixels around the red/blue color interpolation signal R/B and generates a red/blue reference level $\hat{R}_{Target(i,j)}/\hat{B}_{Target(i,j)}$ according to the green difference signal $\Delta G(i,j)$ and the average signal $\overline{R}_{(i,j)}/\overline{B}_{(i,j)}$. In one embodiment, the red reference level $\hat{R}_{Target(i,j)}=\overline{R}_{(i,j)} \pm \Delta G(i,j)$ while the blue reference level $\hat{B}_{Target(i,j)}=\overline{B}_{(i,j)} \pm \Delta G(i,j)$.

The red/blue color interpolation signal noise analyzer 202 is coupled to the red/blue color interpolation signal reference level estimator 201 and receives the red/blue reference level $\hat{R}_{Target(i,j)}/\hat{B}_{Target(i,j)}$. The red/blue color interpolation signal noise analyzer 202 determines if a value of the red/blue color interpolation signal R/B is larger than a sum $(\hat{R}_{Target(i,j)}+C/\hat{B}_{Target(i,j)}+C)$ of the red/blue reference level $\hat{R}_{Target(i,j)}/\hat{B}_{Target(i,j)}$ and a correlation value C, and determines the value of the red/blue color interpolation signal R/B is smaller than a difference $(\hat{R}_{Target(i,j)}-C/\hat{B}_{Target(i,j)}-C)$ between the red/blue reference level $\hat{R}_{Target(i,j)}/\hat{B}_{Target(i,j)}$ and the correlation value C so as to generate an analysis result ru.

The red/blue color interpolation signal noise regulator 203 is coupled to the red/blue color interpolation signal noise analyzer 202 and generates a corrected red/blue color interpolation signal $\tilde{R}_{(i,j)}/\tilde{B}_{(i,j)}$ according to the analysis result ru.

The red/blue color interpolation signal noise analyzer 202 performs analysis on the analysis result ru. If the analysis result ru is that the value of the red/blue color interpolation signal R/B is larger than a sum $(\hat{R}_{Target(i,j)}+C/\hat{B}_{Target(i,j)}+C)$ of the red/blue reference level $\hat{R}_{Target(i,j)}/\hat{B}_{Target(i,j)}$ and a correlation value C, it means an estimating value of the red/blue color interpolation signal R/B is relatively high and the red/blue color interpolation signal noise regulator 203 sets the corrected red/blue color interpolation signal $\tilde{R}_{(i,j)}/\tilde{B}_{(i,j)}$ equivalent to the difference $(\hat{R}_{Target(i,j)}-C/\hat{B}_{Target(i,j)}-C)$ between the red/blue reference level $\hat{R}_{Target(i,j)}/\hat{B}_{Target(i,j)}$ and the correlation value C so as to lower the estimating value.

On the other hand, the red/blue color interpolation signal noise analyzer 202 performs analysis on the analysis result ru. If the analysis result ru is that the value of the red/blue color interpolation signal R/B is smaller than the difference $(\hat{R}_{Target(i,j)}-C/\hat{B}_{Target(i,j)}-C)$ between the red/blue reference level $\hat{R}_{Target(i,j)}/\hat{B}_{Target(i,j)}$ and the correlation value C, it means an estimating value of the red/blue color interpolation signal R/B is relatively low and the red/blue color interpolation signal noise regulator 203 sets the corrected red/blue color interpolation signal $\tilde{R}_{(i,j)}/\tilde{B}_{(i,j)}$ equivalent to the sum $(\hat{R}_{Target(i,j)}+C/\hat{B}_{Target(i,j)}+C)$ of the red/blue reference level $\hat{R}_{Target(i,j)}/\hat{B}_{Target(i,j)}$ and the correlation value C so as to raise the estimating value.

Moreover, the red/blue color interpolation signal noise analyzer 202 performs analysis on the analysis result ru. If the analysis result ru is that the value of the red/blue color interpolation signal R/B is not larger than the sum $(\hat{R}_{Target(i,j)}+C/\hat{B}_{Target(i,j)}+C)$ of the red/blue reference level $\hat{R}_{Target(i,j)}/\hat{B}_{Target(i,j)}$ and the correlation value C and is also not smaller than the difference $(\hat{R}_{Target(i,j)}-C/\hat{B}_{Target(i,j)}-C)$ between the red/blue reference level $\hat{R}_{Target(i,j)}/\hat{B}_{Target(i,j)}$ and the correlation value C, it means an estimating value of the red/blue color interpolation signal R/B is relatively neither high nor low and the red/blue color interpolation signal noise regulator 203 sets the corrected red/blue color interpolation signal $\tilde{R}_{Target(i,j)}/\tilde{B}_{Target(i,j)}$ to equal to the red/blue reference level $\hat{R}_{Target(i,j)}/\hat{B}_{Target(i,j)}$. Further the reason for being set to the red reference level $\hat{R}_{Target(i,j)}=\overline{R}_{(i,j)} \pm \Delta G(i,j)$ or the blue reference level $\hat{B}_{Target(i,j)}=\overline{B}_{(i,j)} \pm \Delta G(i,j)$ is because the two reference levels are generated according to the pixel values of the same color pixel and the green pixels nearby the color pixel so as to have sufficient pixel information for reconstructing a correct image with no noise.

In this way, the false color reduction system 200 properly adjust a value of red or blue color interpolation signal R/B according to original image array information so as to real-time correctly reconstruct an image to enhance image quality for solving the color noise problems like color aliasing and false color in the prior art.

Figure 2B:
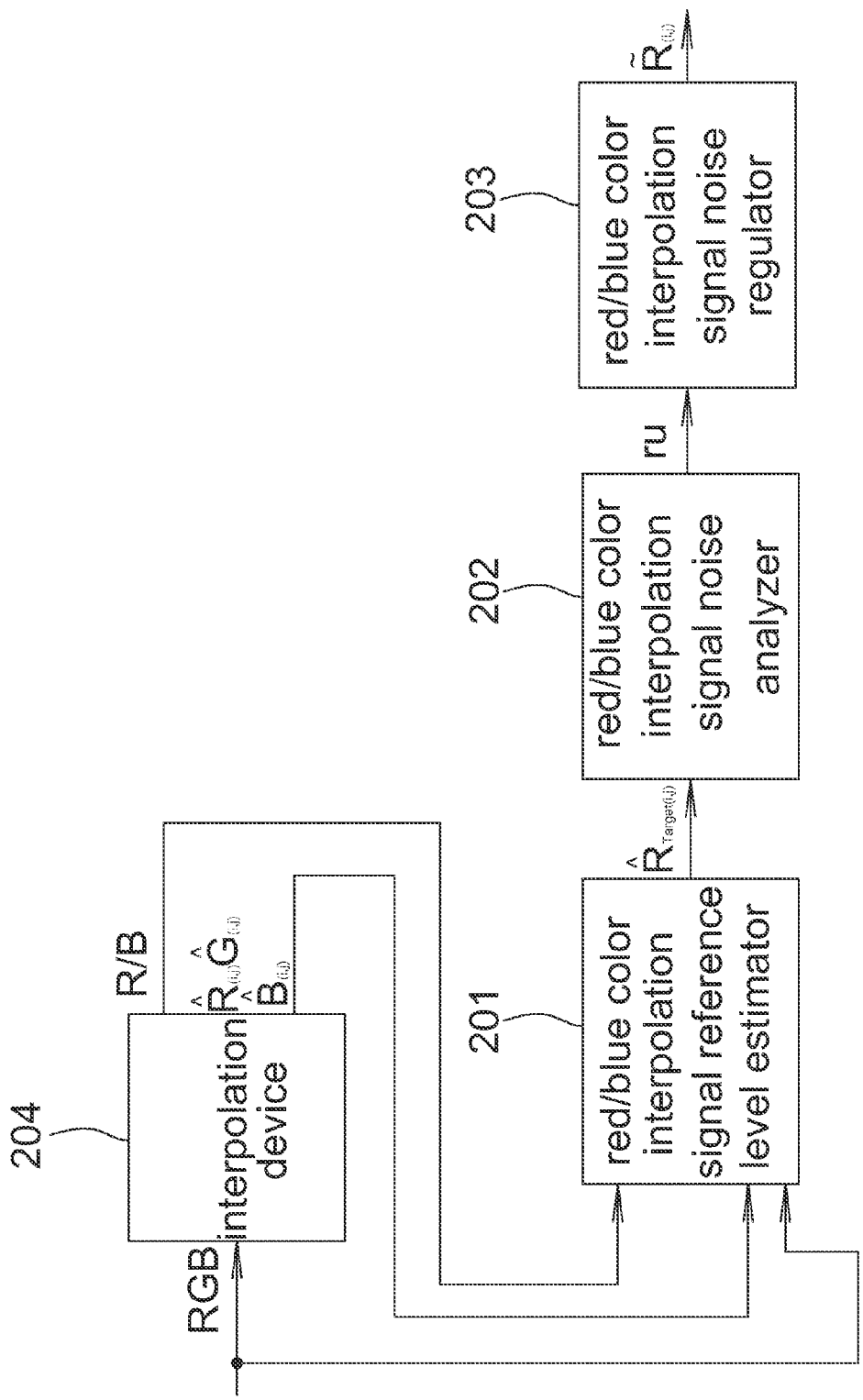
FIG. 2B shows a schematic diagram illustrating a false color reduction system according to another embodiment of the present invention.

It should be noted that the false color reduction system 200 may be applied to any current existed interpolation device or any interpolation device to be developed in the future, for example, the interpolation device 201 shown in FIG. 2B.

Figure 3A:
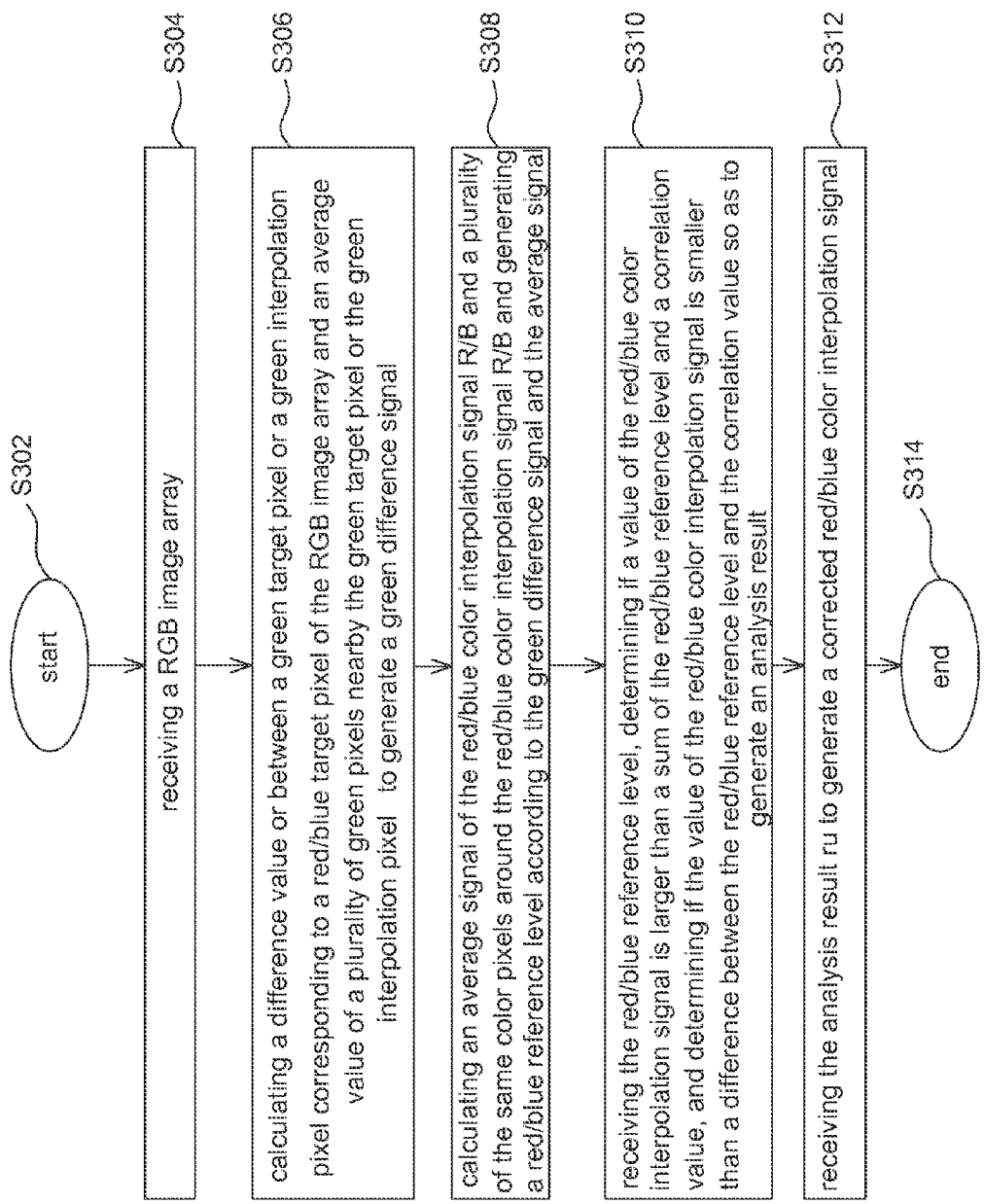
FIG. 3A shows a flow chart of a false color reduction method according to one embodiment of the invention.

FIG. 3A shows a flow chart of a false color reduction method according to one embodiment of the invention. Please refer to FIGS. 2B, 3A, and 3B simultaneously.

Step S302: start.

Step S304: receiving a RGB image array. As shown in FIG. 2B, the interpolation device 204 receives the RGB image array and performs interpolation operation on the RGB image array to generate a red/blue color interpolation signal R/B' to the red/blue color interpolation signal reference level estimator 201. One example of the RGB image array is shown in FIG. 4.

Step S306: calculating a difference value $\overline{G}_{(i,j)}-G_{(i,j)}$ or $\overline{G}_{(i,j)}-\hat{G}_{(i,j)}$ between a green target pixel G(i,j) or a green interpolation pixel $\hat{G}_{(i,j)}$ corresponding to a red/blue target pixel R(i,j)/B(i,j) of the RGB image array and an average value $\overline{G}_{(i,j)}$ of a plurality of green pixels nearby the green target pixel G(i,j) or the green interpolation pixel $\hat{G}_{(i,j)}$ to generate a green difference signal $\Delta G(i,j)$. The red color signal and the blue color signal may be processed by the same method. For instance, a red color signal is taken as an example. It is assumed that the target pixel is a green color pixel G(i,j) shown by line TG of FIG. 4A. The red/blue color interpolation signal reference level estimator 201 receives the RGB image array and the red/blue color interpolation signal R/B, and calculates a difference value $(\overline{G}_{(i,j)}-G_{(i,j)})$ between a green target pixel G(i,j) and an average value $\overline{G}_{(i,j)}$ of green pixels nearby the green target pixel G(i,j) to generate a green difference signal $\Delta G(i,j)$, $\Delta G(i,j)=\overline{G}_{(i,j)}-G_{(i,j)}$. In one embodiment, the average value $\overline{G}_{(i,j)}$ of green pixels can be an average value of a plurality of green pixels G(i−1,j−1), G(i−1,j+1), G(i+1,j−1), and G(i+1,j+1), shown by line NG of FIG. 4A. It should be noted that selection of green pixels nearby the target pixel is not limited to the above example and for example additional pixels nearby or less pixels can be used to generate the average value.

Figure 4B:
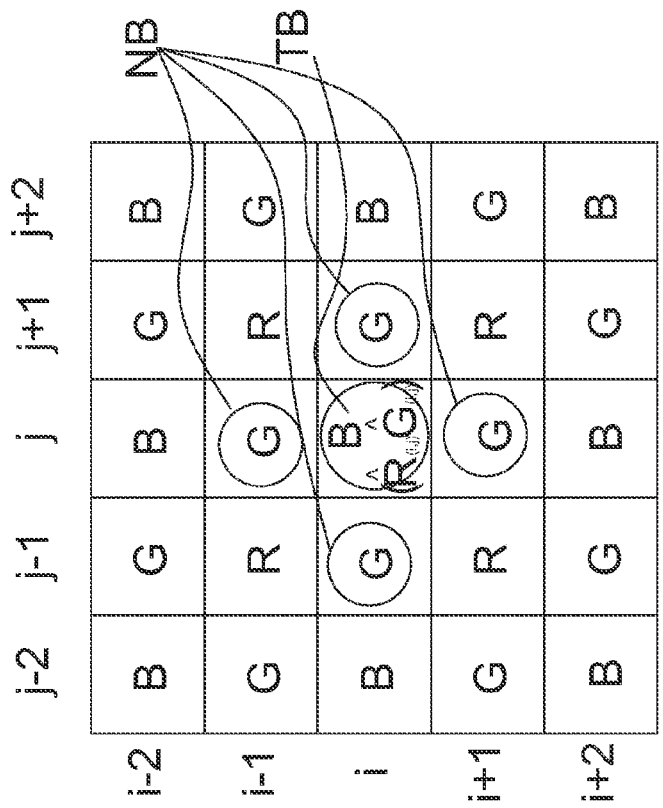
FIG. 4B shows a schematic diagram illustrating an image array according to another embodiment of the invention.
Figure 4A:
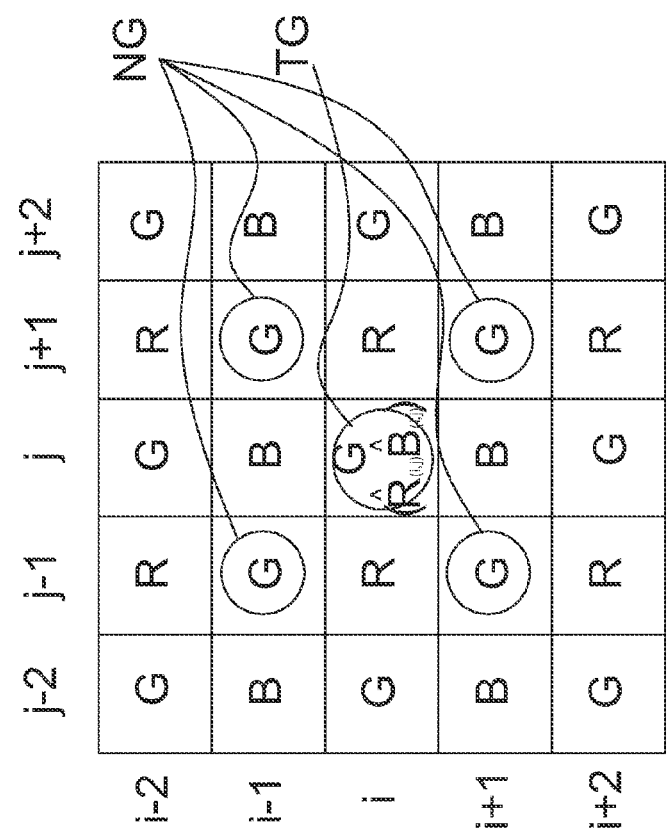
FIG. 4A shows a schematic diagram illustrating an image array according to one embodiment of the invention.

If the target pixel is a blue pixel B(i,j), shown by line TB of FIG. 4B, the red/blue color interpolation signal reference level estimator 201 receives the RGB image array and the red/blue color interpolation signal R/B and calculates a difference value ($\overline{G}_{(i,j)}-\hat{G}_{(i,j)}$) between a green interpolation pixel $\hat{G}_{(i,j)}$ corresponding to the blue target pixel B(i,j) and an average value $\overline{G}_{(i,j)}$ of green pixels nearby the green interpolation pixel $\hat{G}_{(i,j)}$ to generate a green difference signal $\Delta G(i,j)$, $\Delta G(i,j)=\overline{G}_{(i,j)}-\hat{G}_{(i,j)}$. In one embodiment, the average value $\overline{G}_{(i,j)}$ of green pixels can be an average value of a plurality of green pixels G(i−1,j−1), G(i−1,j+1), G(i+1,j−1), and G(i+1,j+1), shown by line NB of FIG. 4B. It should be noted that selection of green pixels nearby the target pixels is not limited to the above example and for example additional pixels nearby or less pixels can be used to generate the average value. It should be also noted that the green interpolation pixel $\hat{G}_{(i,j)}$ is generated by the interpolation device 204, being well understood by one of ordinary skill in the art. Thus, details will not be given hereinafter. It should be also noted that processing the blue color signal can be derived from the above description by one of ordinary skill in the art. Thus, details will not be given hereinafter.

Step S308: calculating an average signal $\overline{R}_{(i,j)}/\overline{B}_{(i,j)}$ of the red/blue color interpolation signal R/B and a plurality of the same color pixels around the red/blue color interpolation signal R/B and generating a red/blue reference level $\hat{R}_{Target(i,j)}/\hat{B}_{Target(i,j)}$ according to the green difference signal $\Delta G(i,j)$ and the average signal $\overline{R}_{(i,j)}/\overline{B}_{(i,j)}$. The red reference level is $\hat{R}_{Target(i,j)}=\overline{R}_{(i,j)}\pm\Delta G(i,j)$ while the blue reference level is $\hat{B}_{Target(i,j)}=\overline{B}_{(i,j)}\pm\Delta G(i,j)$. In one embodiment, processing a red color signal is taken as an example. The red/blue color interpolation signal reference level estimator 201 calculates an average signal $\overline{R}_{(i,j)}$ of the red color interpolation signal $\hat{R}_{(i,j)}$ and a plurality of red color pixels around the red color interpolation signal $\hat{R}_{(i,j)}$. For example, at the position (i,j) shown in FIG. 4A, a red color interpolation signal $\hat{R}_{(i,j)}$ and the surrounding same color pixels R(i−2,j−1), R(i−2,j+1), R(i,j−1), R(i,j+1), R(i+2,j−1), and R(i+2,j+1) are generated after processed by the interpolation device 204. Then, according to the green difference signal $\Delta G(i,j)$ and the average signal $\overline{R}_{(i,j)}$, a red/blue reference level $\hat{R}_{Target(i,j)}$ is generated. It should be noted that the red color interpolation signal $\hat{R}_{(i,j)}$ is positioned at G(i,j) and the estimated value $\hat{R}_{(i,j)}$ is outputted by the interpolation device 204. Furthermore, $\hat{R}_{(i,j)}$ and $\hat{B}_{(i,j)}$ of the center position G(i,j) of the RGB original image array are values of red and green color signals, respectively, generated by interpolation processed by the interpolation device 204. It should be also noted that processing the blue color signal can be derived from the above description being well understood by one of ordinary skill in the art. Thus, details will not be given hereinafter.

Figure 3B:
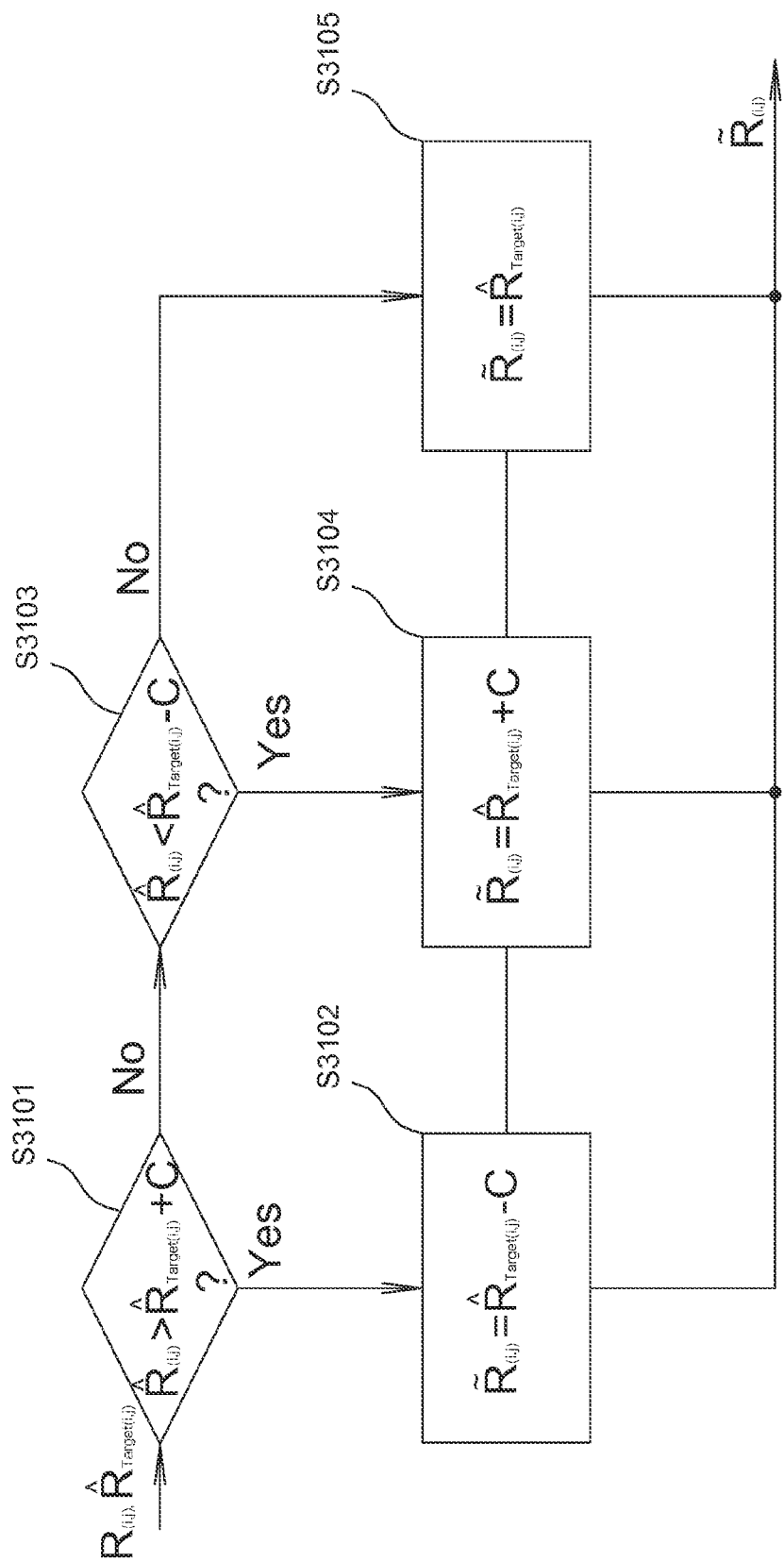
FIG. 3B shows a flow chart of a false color reduction method according to another embodiment of the invention.

Step S310: receiving the red/blue reference level, determining if a value of the red/blue color interpolation signal is larger than a sum of the red/blue reference level and a correlation value, and determining if the value of the red/blue color interpolation signal is smaller than a difference between the red/blue reference level and the correlation value so as to generate an analysis result. FIG. 3B shows a flow chart of the analysis method in step S310 shown in FIG. 3A according to one embodiment of the present invention. The analysis method comprises the following step:

Step S3101: determining if a value of the red/blue color interpolation signal R/B is larger than a sum ($\hat{R}_{Target(i,j)}+C$) of the red/blue reference level and a correlation value C; go to step S3102 if yes; go to step S3103 if no.

Step S3102: setting the corrected red/blue color interpolation $\tilde{R}_{(i,j)}$ signal equivalent to a difference ($\hat{R}_{Target(i,j)}-C$) between the red/blue reference level and the correlation value C.

Step S3103: determining if a value of the red/blue color interpolation signal R/B is smaller than a difference ($\hat{R}_{Target(i,j)}-C$) between the red/blue reference level and the correlation value C; go to step S3104 if yes; go to step S3105 if no.

Step S3104: setting the corrected red/blue color interpolation $\tilde{R}_{(i,j)}$ signal equivalent to a sum ($\hat{R}_{Target(i,j)}+C$) of the red/blue reference level and the correlation value C.

Step S3105: setting the corrected red/blue color interpolation $\tilde{R}_{(i,j)}$ signal equivalent to the red/blue reference level $\hat{R}_{Target(i,j)}$ when the value of the red/blue color interpolation signal R/B is not larger than a sum ($\hat{R}_{Target(i,j)}+C$) of the red/blue reference level and the correlation value C and is not smaller than the difference ($\hat{R}_{Target(i,j)}-C$) of the red/blue reference level and the correlation value C at the time.

Step S312: receiving the analysis result ru to generate a corrected red/blue color interpolation signal $\tilde{R}_{(i,j)}/\tilde{B}_{(i,j)}$.

Step S314: end.

Figures 5A, 5B, 5C, 5D:
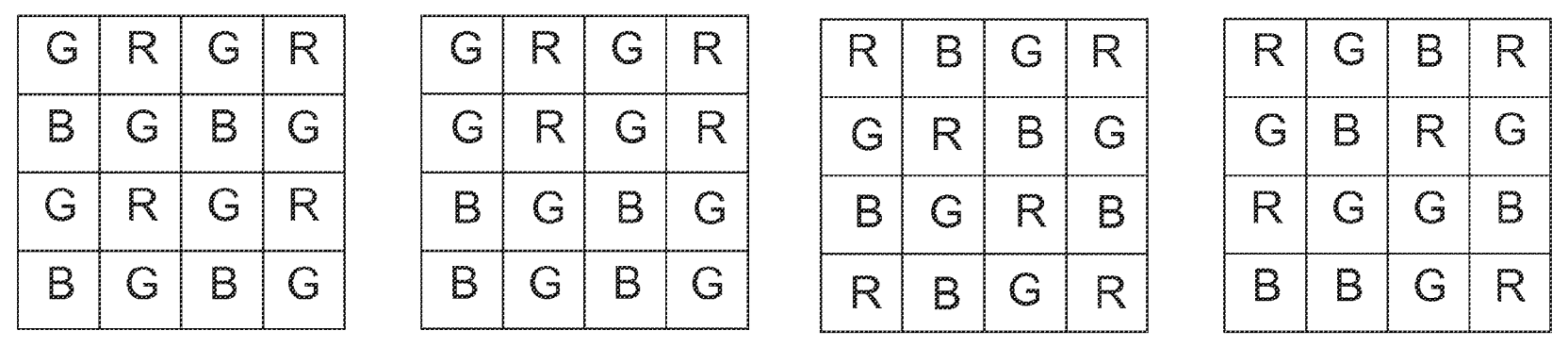

It should be noted that the false color reduction system and method according to the embodiments of the present invention can be applied to, for example, a Bayer color filter array shown in FIG. 5A, a Bayer color filter array of a varied style shown in FIG. 5B, a Bayer color filter array of a diagonal stripe style shown in FIG. 5C, and a Bayer color filter array of a random style shown in FIG. 5D. Certainly, the false color reduction system and method according to the embodiments of the present invention can be applied to any current RGB color filter array or any future RGB color filter array to be developed.

The false color reduction system and method according to the embodiments of the present invention properly adjust a value of red or blue color interpolation signal R/B according to original image array information to real-time correctly reconstruct an image to enhance image quality for solving the color noise problems like color aliasing and false color in the prior art. Moreover, the false color reduction system and method according to the embodiments of the present invention do not need additional buffer memory and do not need to complete all-color interpolation stored in the image array in the buffer memory in advance to process correction but can achieve the purpose of false color reduction.

Although the present invention has been fully described by the above embodiments, the embodiments should not constitute the limitation of the scope of the invention. Various modifications or changes can be made by those who are skilled in the art without deviating from the spirit of the invention.

What is claimed is:

1. A false color reduction system, receiving a RGB image array comprising:
   a red/blue color interpolation signal reference level estimator, receiving the RGB image array and a red/blue color interpolation signal of the RGB image array, calculating a difference value between a green target pixel and an average value of a plurality of green pixels nearby the green target pixel, or calculating a difference value between a green interpolation pixel corresponding to a red/blue target pixel of the RGB image array and an average value of a plurality of green pixels nearby the green interpolation pixel to generate a green difference signal, calculating an average signal of the red/blue color interpolation signal and a plurality of the same color pixels around the red/blue color interpolation signal, and generating a red/blue reference level according to the green difference signal and the average signal;

a red/blue color interpolation signal noise analyzer, coupled to the red/blue color interpolation signal reference level estimator, wherein the red/blue color interpolation signal noise analyzer receives the red/blue reference level, determines if a value of the red/blue color interpolation signal is larger than a sum of the red/blue reference level and a correlation value, and determines if the value of the red/blue color interpolation signal is smaller than a difference between the red/blue reference level and the correlation value so as to generate an analysis result; and a red/blue color interpolation signal noise regulator, coupled to the red/blue color interpolation signal noise analyzer, wherein the red/blue color interpolation signal noise regulator receives the analysis result to generated a corrected red/blue color interpolation signal.

2. The system according to claim 1, wherein the corrected red/blue color interpolation signal is set to equal to a difference between the red/blue reference level and the correlation value if a value of the red/blue color interpolation signal is larger than a sum of the red/blue reference level and the correlation value.

3. The system according to claim 1, wherein the corrected red/blue color interpolation signal is set to equal to a sum of the red/blue reference level and the correlation value if a value of the red/blue color interpolation signal is smaller than a difference between the red/blue reference level and the correlation value.

4. The system according to claim 1, wherein the corrected red/blue color interpolation signal is set to equal to the red/blue reference level if a value of the red/blue color interpolation signal is not larger than a sum of the red/blue reference level and the correlation value, and is not smaller than a difference between the red/blue reference level and the correlation value.

5. The system according to claim 1, wherein a high-pass filter mask processing is used to obtain high-frequency information of the green target pixel so as to generate the green difference signal.

6. The system according to claim 1, for performing real-time false color reduction.

7. The system according to claim 1, which is coupled to a color interpolation device.

8. A false color reduction method, comprising:
receiving a RGB image array and a red/blue color interpolation signal of the RGB image array;
calculating a difference value between a green target pixel and an average value of a plurality of green pixels nearby the green target pixel, or calculating a difference value between a green interpolation pixel corresponding to a red/blue target pixel of the RGB image array and an average value of a plurality of green pixels nearby the green interpolation pixel to generate a green difference signal;
calculating an average signal of the red/blue color interpolation signal and a plurality of the same color pixels around the red/blue color interpolation signal and generating a red/blue reference level according to the green difference signal and the average signal;
receiving the red/blue reference level, determining if a value of the red/blue color interpolation signal is larger than a sum of the red/blue reference level and a correlation value, and determining the value of the red/blue color interpolation signal is smaller than a difference between the red/blue reference level and the correlation value so as to generate an analysis result; and
receiving the analysis result to generate a corrected the red/blue color interpolation signal.

9. The method according to claim 8, wherein the corrected red/blue color interpolation signal is set to equal to a difference between the red/blue reference level and the correlation value if a value of the red/blue color interpolation signal is larger than a sum of the red/blue reference level and the correlation value.

10. The method according to claim 8, wherein the corrected red/blue color interpolation signal is set to equal to a sum of the red/blue reference level and the correlation value if a value of the red/blue color interpolation signal is smaller than a difference between the red/blue reference level and the correlation value.

11. The method according to claim 8, wherein the corrected red/blue color interpolation signal is set to equal to the red/blue reference level if a value of the red/blue color interpolation signal is not larger than a sum of the red/blue reference level and the correlation value, and is not smaller than a difference between the red/blue reference level and the correlation value.

12. The method according to claim 8, wherein the green difference signal is generated by using high-pass filter mask processing to obtain high-frequency information of the green target pixel.

* * * * *